United States Patent
Shen

(10) Patent No.: US 7,346,474 B2
(45) Date of Patent: Mar. 18, 2008

(54) METHOD OF ANALYZING RESIDUAL FLUID AND COMPUTER READABLE MEDIUM

(75) Inventor: Jianrong Shen, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/140,948

(22) Filed: Jun. 1, 2005

(65) Prior Publication Data

US 2005/0269207 A1 Dec. 8, 2005

(30) Foreign Application Priority Data

Jun. 2, 2004 (JP) ............ P.2004-164611
Jun. 2, 2004 (JP) ............ P.2004-164614

(51) Int. Cl.
*G06F 11/30* (2006.01)
(52) U.S. Cl. ................................ 702/183
(58) Field of Classification Search .......... 702/35, 702/182, 183; 700/95, 96, 97
See application file for complete search history.

(56) References Cited

U.S. PATENT DOCUMENTS 6,926,816 B2 *  8/2005  Sano et al. ............. 205/81
2003/0042135 A1  3/2003  Katsumaru et al.
2003/0182006 A1  9/2003  Shin et al.
2004/0195439 A1 * 10/2004  Hamamoto et al. ......... 244/72

FOREIGN PATENT DOCUMENTS

| EP | 1270766 A2 | 1/2003 |
| EP | 1351035 A | 10/2003 |
| JP | 6-88383 | 3/1994 |
| JP | 10-45037 | 2/1998 |

OTHER PUBLICATIONS http://mw1.merriam-webster.com/dictionary/vehicle, p. 1.*

* cited by examiner

*Primary Examiner*—Tung S. Lau
(74) *Attorney, Agent, or Firm*—Smith, Gambrell & Russell, LLP

(57) ABSTRACT

A computer generates an analysis model in which an object is represented by meshes. When attributes of the meshes corresponding to space which possibly becomes a cause of residual fluid are set to a first substance causing the residual fluid, the attribute of the mesh corresponding to the boundary between the object and outside of the object and corresponding to the space is set from the first substance to a second substance of which specific gravity differs from that of the first substance. Then, the attribute is changed from the first substance to the second substance according to attribute of the mesh exists in the periphery, assuming the meshes of which attribute is set to the first substance as a processing subject. Accordingly, the presence or absence of residual fluid is determined according to the presence or absence of the meshes of which attribute is set to the first substance.

30 Claims, 8 Drawing Sheets

METHOD OF ANALYZING RESIDUAL FLUID AND COMPUTER READABLE MEDIUM

This application claims foreign priorities based on Japanese Patent application No. 2004-164611, filed Jun. 2, 2004, and Japanese Patent application No. 2004-164614, filed Jun. 2, 2004, the contents of which is incorporated herein by reference in its entirety.

BACKGROUND OF THE INVENTION

1. Field of the Invention

The present invention relates to a method for analyzing a residual fluid retained in an object when performing immersion treatment, and a computer readable medium having a program for permitting a computer to perform an analysis of a residual fluid retained in an object on which an immersion treatment is performed.

2. Description of the Related Art

Electrodeposition coating has widely been used as an undercoating of various members such as a component or a body of a vehicle, since a coating film uniformly adheres to a surface of an object and corrosion resistance is also good. In the electrodeposition coating, by immersing the object in an electrodeposition bath filled with electrodeposition liquid, a coating film is formed on a surface of the object using an electrophoretic phenomenon or an electrodialysis phenomenon, etc. of a polymer electrolyte. The electrodeposition process including the immersion treatment is ended by pulling up the object from the electrodeposition bath.

In electrodeposition coating, it becomes important to perform immersion treatment in consideration of a phenomenon such as a liquid retention or an air retention occurring with the immersion treatment from the standpoint of uniform coating film formation. The liquid retention is a phenomenon in which the electrodeposition liquid is retained in space after pulling up the object from the electrodeposition bath. The air retention is a phenomenon in which air is retained in space such as a gap when immersing the object in the electrodeposition bath.

When the liquid retention occurs, in a subsequent treatment process (for example, a dry process), the retained electrodeposition liquid drips off on a coating film surface and it becomes a cause of occurrence of a defective coating film called the so-called secondary drip. When the defective coating film occurs, a worker must scrape the secondary drip by hand and this leads to disadvantages such as an increase in manufacturing cost or a decrease in working efficiency. Therefore, in the related art, for example as disclosed in JP-A-06-88383, immersion treatment with respect to an object is performed after a shape of the object is properly designed so as to suppress the occurrence of liquid retention.

When the air retention occurs, the electrodeposition liquid does not adhere to some region of the object, and it becomes a cause of occurrence of a uncoated region or a coating irregularity. Therefore, in the related art, for example as disclosed in JP-A-10-45037, immersion treatment with respect to an object is performed after a shape of the object is properly designed so as to suppress the occurrence of air retention.

The presence or absence of the liquid retention and/or the air retention occurring in the object can be determined previously by the analysis method using a free surface. However, in the case when a shape of the object is complicated, for example, in the case of a vehicle body, there is a problem that the analysis takes long time since analysis processing becomes complicated.

SUMMARY OF THE INVENTION

Therefore, an object of the invention is to efficiently make an analysis of the residual fluid retained in an object on which an immersion treatment is performed by simplifying analysis processing.

In order to solve such a problem, a first aspect of the invention provides a method of analyzing a residual fluid retained in an object on which an immersion treatment is performed, said method comprises generating an analysis model in which the object is represented by meshes, setting, in the analysis model, attributes of the meshes corresponding to space which possibly becomes a cause of the residual fluid to a first substance causing the residual fluid, setting the attribute of the meshes corresponding to a boundary between the object and outside of the object and corresponding to the space from the first substance to a second substance of which specific gravity differs from that of the first substance, assuming a processing subject is each of the meshes of which attribute is set to the first substance, changing the attribute of the mesh used as the processing subject from the first substance to the second substance according to the attribute of the meshes exist in the periphery of the mesh used as the processing subject, and determining the presence or absence of the residual fluid retained in the object according to the presence or absence of the meshes of which attribute is set to the first substance.

In the first aspect of the invention, the residual fluid retained in the object is a liquid retention, the first substance causing the liquid retention is liquid, and the second substance is gas.

In the first aspect of the invention, after setting the attributes of the meshes corresponding to space to gas in the analysis model, the attribute of the mesh which locates in a boundary of space and a wall surface of the object among the meshes set to gas is set from gas to liquid.

In the first aspect of the invention, when the mesh of which attribute is gas and of which centroid is lower than or equal to a centroid of the mesh used as the processing subject is adjacent to the periphery of the mesh used as the processing subject, the attribute of the mesh used as the processing subject is changed from liquid to gas.

In the first aspect of the invention, the meshes are arranged in lattice shape, and when any attribute of the meshes adjacent to sideward portions and lower portion of the mesh used as the processing subject is gas, the attribute of the mesh used as the processing subject is changed from liquid to gas.

Further, in the first aspect of the invention, the residual fluid retained in the object is an air retention, the first substance causing the liquid retention is gas, and the second substance is liquid.

In the first aspect of the invention, after setting the attributes of the meshes corresponding to space to liquid in the analysis model, the attribute of the mesh which locates in a boundary of space and a wall surface of the object among the meshes set to liquid is set from liquid to gas.

In the first aspect of the invention, when the mesh of which attribute is liquid and of which centroid is higer than or equal to a centroid of the mesh used as the processing subject is adjacent to the periphery of the mesh used as the processing subject, the attribute of the mesh used as the processing subject is changed from gas to liquid.

In the first aspect of the invention, the meshes are arranged in lattice shape, and when any attribute of the meshes adjacent to sideward portions and lower portion of the mesh used as the processing subject is liquid, the attribute of the mesh used as the processing subject is changed from gas to liquid.

A second aspect of the invention provides a computer readable medium having a program including instructions for permitting a computer to perform an analysis of a residual fluid retained in an object on which an immersion treatment is performed, said instructions comprises generating an analysis model in which the object is represented by meshes, setting, in the analysis model, attributes of the meshes corresponding to space which possibly becomes a cause of the residual fluid to a first substance causing the residual fluid, setting the attribute of the meshes corresponding to a boundary between the object and outside of the object and corresponding to the space from the first substance to a second substance of which specific gravity differs from that of the first substance, assuming a processing subject is each of the meshes of which attribute is set to the first substance, changing the attribute of the mesh used as the processing subject from the first substance to the second substance according to the attribute of the meshes exist in the periphery of the mesh used as the processing subject, and determining the presence or absence of the residual fluid retained in the object according to the presence or absence of the meshes of which attribute is set to the first substance.

In the second aspect of the invention, the residual fluid retained in the object is a liquid retention, the first substance causing the liquid retention is liquid, and the second substance is gas.

In the second aspect of the invention, after setting the attributes of the meshes corresponding to space to liquid in the analysis model, the attribute of the mesh which locates in a boundary of space and a wall surface of the object among the meshes set to liquid is set from liquid to gas.

In the second aspect of the invention, the residual fluid retained in the object is an air retention, the first substance causing the air retention is gas, and the second substance is liquid.

In the second aspect of the invention, wherein after setting the attributes of the meshes corresponding to space to liquid in the analysis model, the attribute of the mesh which locates in a boundary of space and a wall surface of the object among the meshes set to liquid is set from liquid to gas.

DESCRIPTION OF THE PRFERRED EMBODIMENTS

First Embodiment

Figure 1:
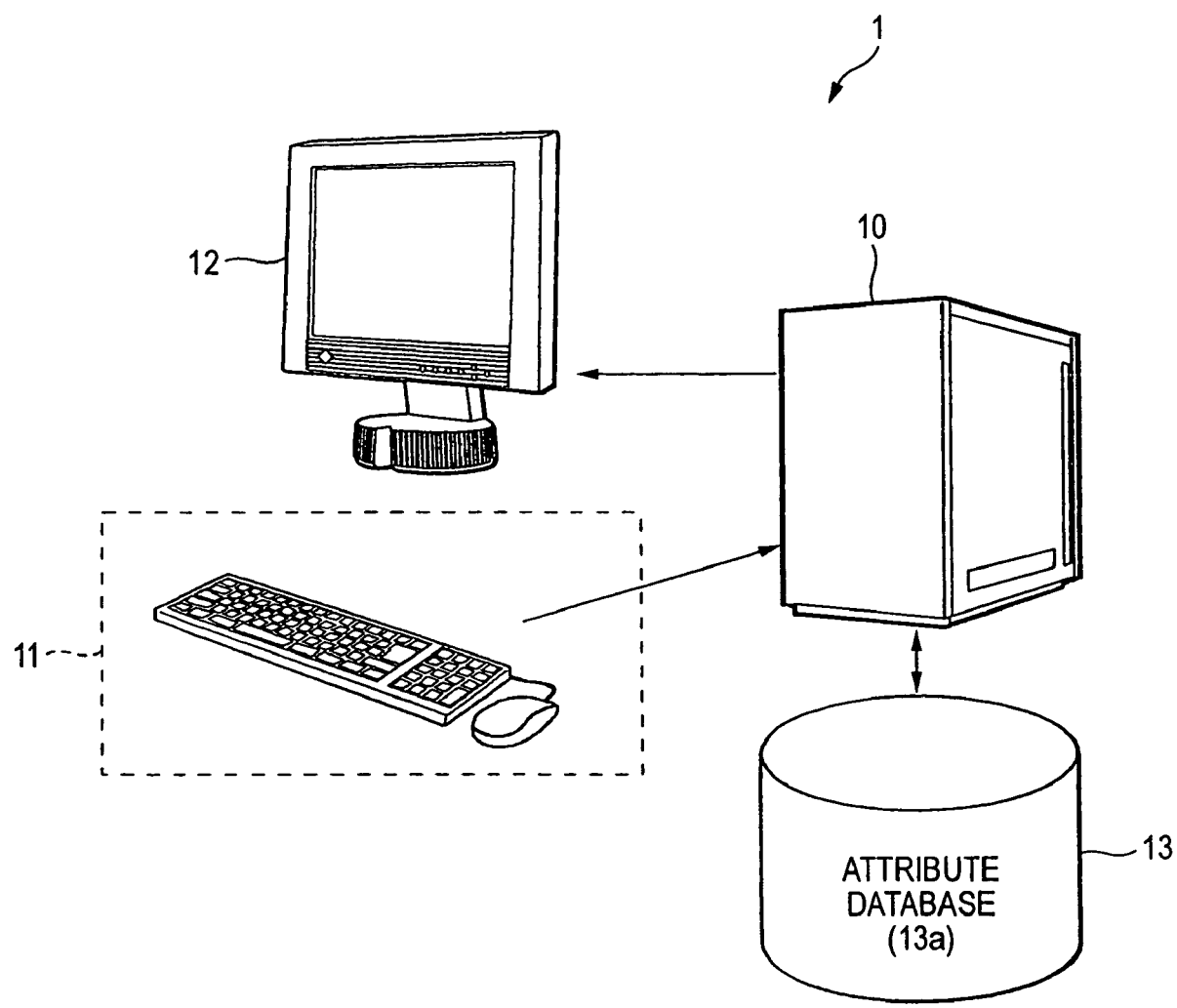
FIG. 1 is a diagram showing whole configuration of an analysis system according to embodiments of the present invention.

FIG. 1 is a diagram showing whole configuration of an analysis system according to a first embodiment of the present invention. An analysis system 1 comprises a computer 10, an input device 11 such as a keyboard or a mouse, a display device 12 such as a CRT or a liquid crystal display, and a storage device 13 such as a magnetic disk. The computer 10 mainly comprises a CPU, ROM, RAM and an I/O interface, and analyzes a liquid retention retained in an object on which an immersion treatment is performed.

Figure 2:
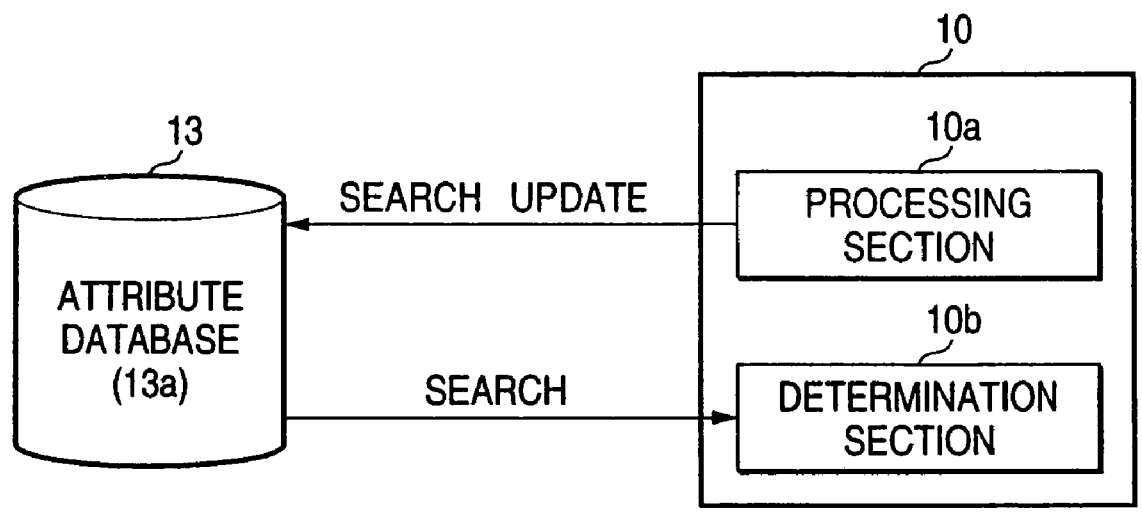
FIG. 2 is a block diagram showing a functional configuration of a computer.

FIG. 2 is a block configuration diagram of the computer 10. When the computer 10 is functionally grasped, the computer 10 has a processing section 10a and a determination section 10b. The processing section 10a generates an analysis model in which the object is represented by three-dimensional meshes, or an analysis model in which a two-dimensional cross section of the object is represented by meshes, etc. according to a purpose. Incidentally, in the present embodiment, for simplifying the explanation, description will be made using an analysis model in which a two-dimensional cross section of the object is represented by square meshes. After setting the attributes of meshes corresponding to space to liquid in the analysis model, the processing section 10a changes the attributes of meshes corresponding to a boundary with the outside from liquid to gas. Then, for the meshes whose attributes are set to liquid, the attributes are changed from liquid to gas according to the attributes of meshes exist in the self-periphery. The determination section 10b determines the presence or absence of liquid retention occurring in the object according to the presence or absence of the meshes whose attributes are set to liquid in the analysis model.

Based on information displayed on the display device 12, an operator operates the input device 11 and does inputs, etc. of a shape or a numeric value of the object of an analysis subject. Various databases necessary to analyze the liquid retention are stored in the storage device 13. In the present embodiment, an attribute database 13a is important. The attribute database 13a is a database for storing attributes set for meshes, and for every object of the analysis subject, is constructed of an attribute record group in which an individual identification number (hereinafter called "record number") is given. Basically, an attribute of a mesh and an identification number (hereinafter called "mesh number") for identifying each of the meshes are described in an individual attribute record being associated with each other.

Figure 3:
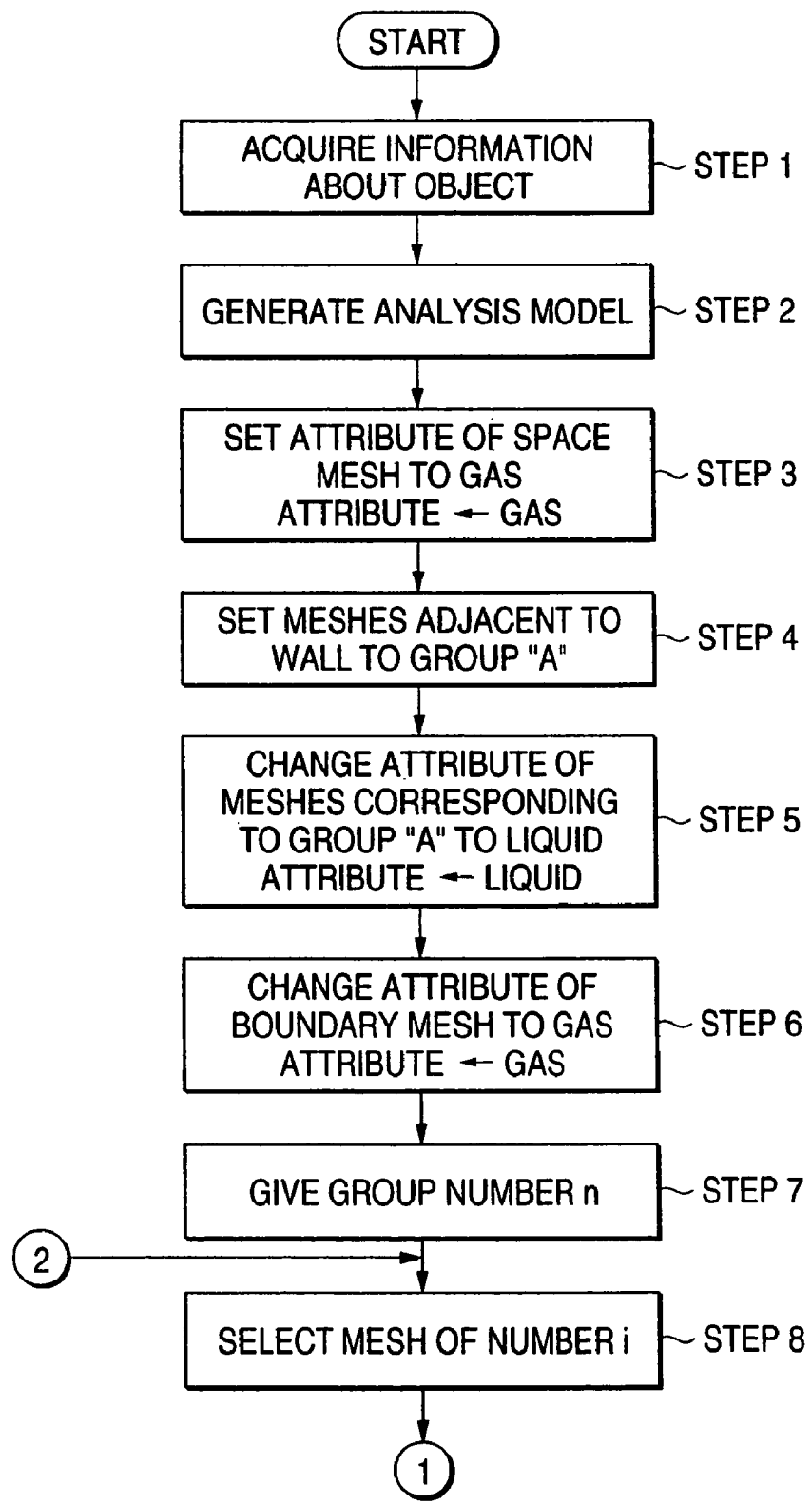
FIG. 3 is a flowchart showing an analysis procedure according to a first embodiment of the present invention.
Figure 4:
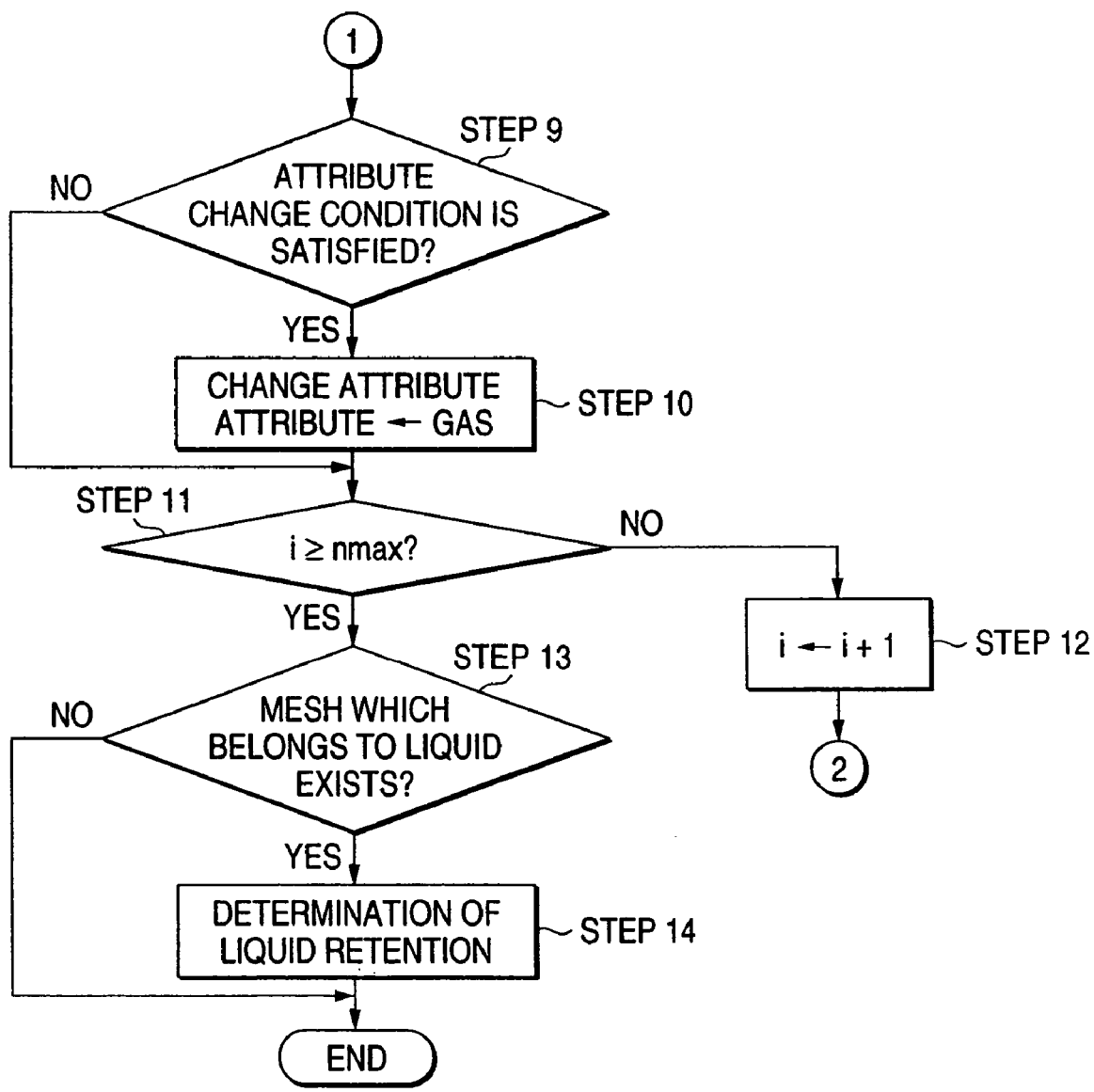
FIG. 4 is a flowchart showing the analysis procedure according to a first embodiment of the present invention.

FIG. 3 and FIG. 4 are flowcharts showing an analysis procedure according to the present embodiment. First, in step 1, information about the object is acquired according to an operation of the input device 11 by the operator. The information acquired in the step 1 includes a shape of the object or analysis precision, etc.

In step 2, an analysis model is generated. The analysis model is a model for analysis in which each of the two-dimensional cross sections of the object is represented by a plurality of minute elements (meshes) having an identical shape. In the present embodiment, the two-dimensional cross sections of the object including the vertical axis are modeled from the standpoint of reproducing a fluid state of fluid in a direction of gravity. The shape of the individual meshes in the analysis model is set in square shape for the reason that representation of the shape is easy regardless of the shape of the object, and each of the meshes is arranged in lattice shape. The number of meshes per unit area of the analysis model can be set arbitrarily according to analysis precision. For example, in the case that an internal shape of the object is complicated or that an analysis of liquid retention is performed with high precision, the meshes are arranged densely. On the other hand, in the case that an internal shape of the object is simple or that a determination of liquid retention is performed with rough precision, the meshes are arranged less densely than the former. The mesh number for identifying the self is given to each of the meshes.

The meshes constructing the analysis model include meshes corresponding to a member of the object and meshes corresponding to space. The space in the object is structural gaps or cavities, or concaves, etc. (regions caved into the inside from a contour defining an external shape of the two-dimensional cross section of the object), and possibly becomes a cause of liquid retention. Because of that, in the analysis model, the mesh corresponding to space (hereinafter called "space mesh") is extracted in step 3. In the extracted space meshes, an attribute of the space mesh is set to gas in order to indicate that the self-mesh is space (air). With this, after a new record number is obtained, an attribute record is newly added to the attribute database 13a. The attribute and the mesh number of the extracted space mesh are described in the attribute record being associated with each other.

In step 4, in the extracted space mesh, meshes located in the boundary with a wall surface of the object, that is, meshes adjacent to the meshes corresponding to the member of the object are extracted. The extracted space mesh is classified as a group to which an identifier "A" is given in order to distinguish the extracted space mesh from the other space mesh. The attribute of the space mesh classified as the group A is changed from gas to liquid (step 5). This change result is reflected on the attribute record added in the previous step 3 in the attribute database 13a. In this case, in the attribute record, search of the corresponding space mesh is performed using the mesh number as a search key (similarly in the following steps).

In step 6 subsequent to the step 5, outside boundary mesh is extracted in the space mesh classified as the group A. In the space mesh of the group A, the outside boundary mesh is meshes corresponding to the boundary with the outside of the object, that is, meshes corresponding to an opening portion of the space. The attribute of the extracted outside boundary mesh is changed from liquid to gas, and according to this, description of the attribute database 13a is also updated.

In step 7, an identification number (hereinafter called "group number") n (n is a natural number) for identifying the self is given to the space mesh of the group A excluding the outside boundary mesh. In processing subsequent to step 8 described below, as the space mesh of a processing subject is selected according to the group number n, the group number n is given being associated with an order of selection of the meshes. Specifically, the group number n is given so that the processing sequentially proceeds from the upper space mesh toward the lower space mesh of the analysis model. In this case, the group number n is given so that, for the space meshes having the same height, the processing proceeds from the space mesh closer to the outside boundary mesh toward the remote space mesh.

Figure 5A:
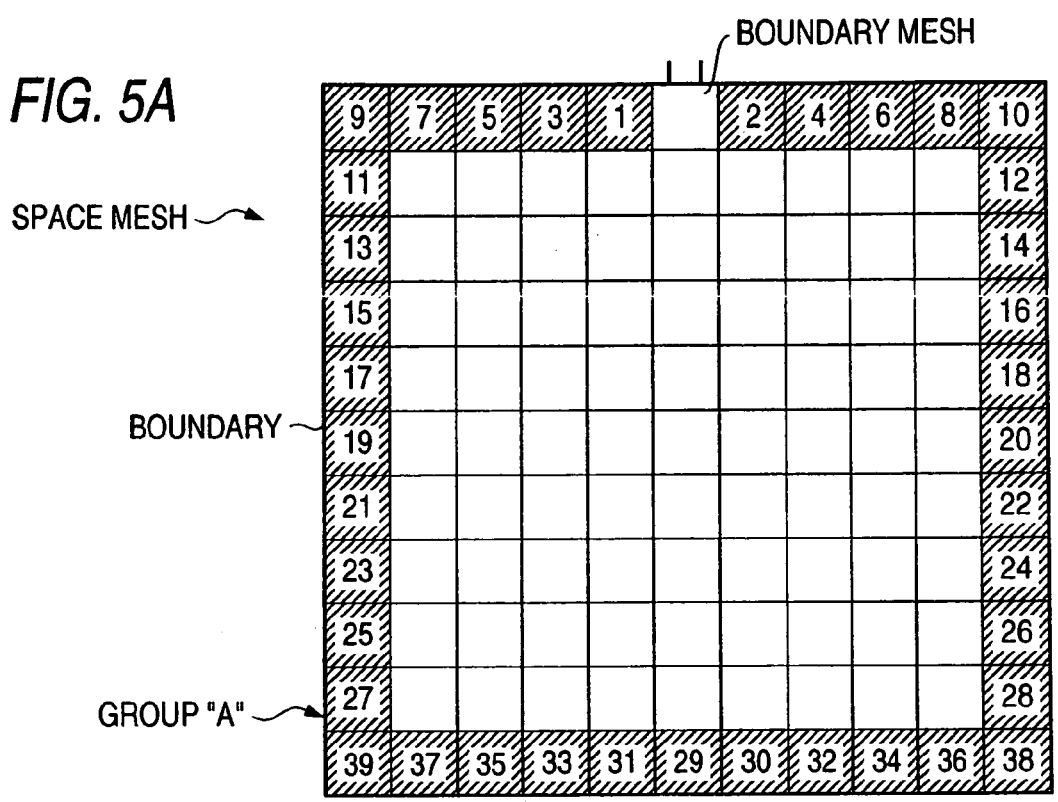
FIGS. 5A and 5B are explanatory diagrams of the group number according to a first embodiment of the present invention.
Figure 5B:
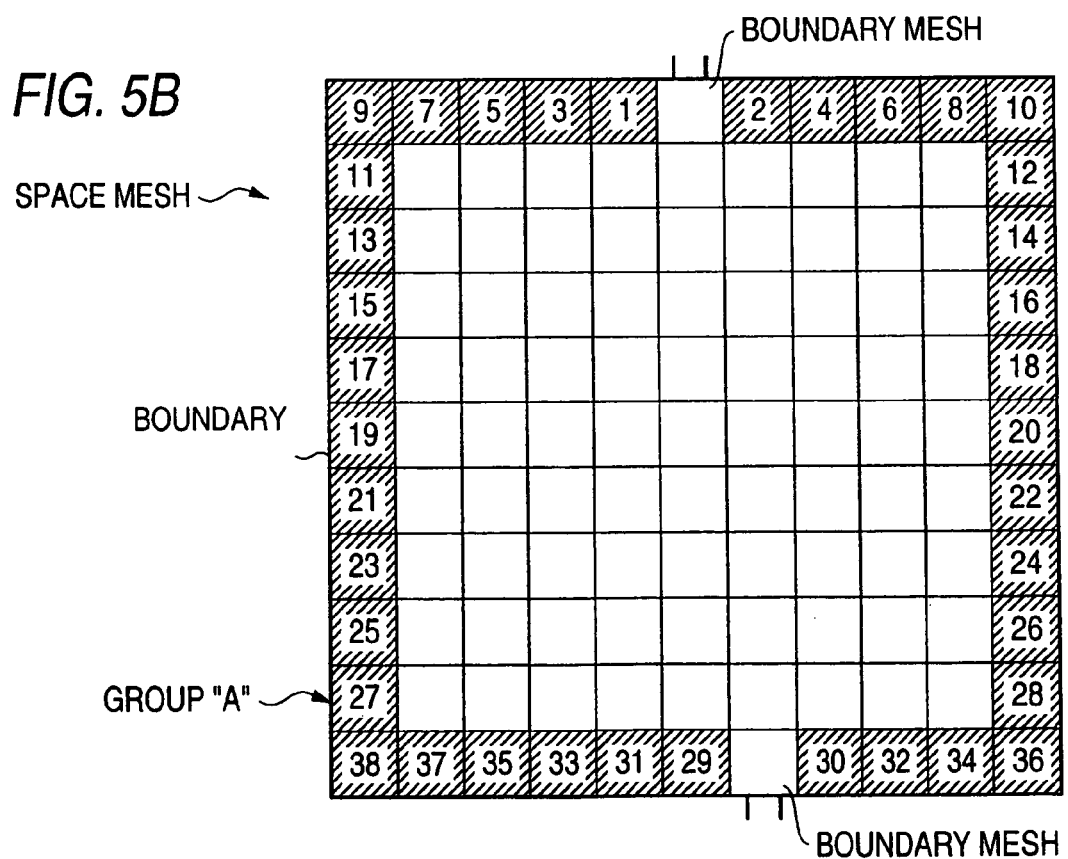

FIGS. 5A and 5B are explanatory diagrams of the group number n according to the present embodiment of the invention. FIGS. 5A and 5B show each of the analysis models related to objects of different shapes, and for convenience of description, the boundary with a member and the space mesh are shown. Hatching is done on the space mesh classified as the group A excluding the outside boundary mesh, and also group number n for identifying the self is shown. When giving the group number, the group number n is described in a manner that the corresponding attribute record of the attribute database 13a being associated with the space mesh.

In step 8, the space mesh of the group number corresponding to a number "i" according to a loop variable i is selected as a processing subject mesh on which a processing is performed. The loop variable i is initialized at an initial value ("1" in the present embodiment) in an initial routine performed before a start of the present routine. As a result of that, initially, the space mesh of the group number corresponding to the number "1" is selected as the processing subject mesh at first.

In step 9, whether or not the processing subject mesh satisfies an attribute change condition is determined based on the attribute of the space mesh exist in the periphery. Specifically, the space mesh adjacent to the sideward portions and the lower portion of the processing subject mesh, that is, the right and left and the bottom of the processing subject mesh is searched using the mesh number as a search key in the attribute record. It is determined that the attribute change condition is satisfied when the attribute of any extracted space mesh is gas. On the other hand, it is determined that the attribute change condition is not satisfied when all the attributes of each of the space mesh are liquid. When a positive determination is made in this step 9, that is, when the attribute change condition is satisfied, the flowchart proceeds to step 10. On the other hand, when a negative determination is made in this step 9, that is, when the attribute change condition is not satisfied, step 10 is skipped and the flowchart proceeds to step 11.

In step 10, the attribute of the processing subject mesh (group number i) is changed from liquid to gas. According to the change, the attribute of the processing subject mesh is changed from liquid to gas in the attribute database 13a.

In step 11, it is determined whether or not the loop variable i reaches the maximum value nmax of the group number n. When a negative determination is made in this step 11, that is, the loop variable i does not reach the maximum value nmax of the group number n, the flowchart proceeds to step 12. Then, in step 12, the loop variable i is incremented by one and the flowchart returns to step 8. The processing from step 8 to step 10 is repeatedly performed while sequentially shifting the processing subject mesh until the loop variable i reaches the maximum value nmax of the group number n by the determination processing of this step 11. On the other hand, when a positive determination is made in this step 11, that is, the loop variable i reaches the maximum value nmax of the group number n, the flowchart proceeds to step 13.

In step 13, it is determined whether or not a space mesh whose attribute is liquid is present in the analysis model. Specifically, the attribute record is searched based on the record number in the attribute database 13a. Then, the presence or absence of the space mesh whose attribute is liquid is determined based on the attribute of each of the space meshes described in the extracted attribute record. When a positive determination is made in this step 13, that is, the space mesh which belongs to liquid is present, the flowchart proceeds to step 14. Then, after liquid retention determination processing such as displaying a message that liquid retention occurs on the display device 12 is performed in step 14, the process exits from the present routine. In this case, the computer 10 may perform processing such as displaying colors according to the attribute of the space mesh in the analysis model so as to see a position of the space mesh which belongs to liquid. On the other hand, when a negative determination is made in this step 13, that is, the attributes of all the space meshes are gas, step 14 is skipped and the process exits from the present routine. Incidentally, in this case, processing such as displaying a message that liquid retention does not occur may be performed.

A concept of an analysis method of the present embodiment will be described below. The analysis method only has effectiveness by setting attribute with different solid state properties (specifically, specific gravity) to individual space meshes constructing an analysis model. The attribute is gas simulating the air or liquid simulating the electrodeposition liquid. The attribute set to the individual space mesh represents the presence of a substance according to the attribute in the self mesh position.

A two-dimensional cross section of the object corresponding to the analysis model includes a region corresponding to space or a member of the object. Possibly the region corresponding to the space among these regions becomes the retained space of electrodeposition liquid when pulling up the object from the electrodeposition bath (occurrence of liquid retention). As a result of that, from the standpoint of searching the space which becomes a cause of the liquid retention, an attribute of a space mesh in the analysis model is set to gas (step 3).

Also, the electrodeposition liquid having specific gravity heavier than that of air does not exist in a state of floating in the air, and when the electrodeposition liquid is retained as liquid retention, the electrodeposition liquid at least exists on a wall surface of the object. Therefore, from the standpoint of representing the electrodeposition liquid which is possibly retained in the analysis model, attribute of the space mesh belonging to a group A is changed from gas to liquid. On the other hand, when space is opened to the outside, it is considered that the electrodeposition liquid flows out from the location of the opening. In this case, the electrodeposition liquid does not stay in the location, so that the opening portion becomes the space. Therefore, in the space mesh classified as the group A, an attribute of an outside boundary mesh is changed from liquid to gas (step 6).

As described above, when an initial condition relating to the attribute of each of the space mesh is set, a fluid state of the electrodeposition liquid when being pulled up from the electrodeposition bath is reproduced by a change of the attribute of the mesh based on a specific gravity relation. That is, when a mesh belonging to gas exists just below a processing subject mesh, an attribute of the processing subject mesh is changed to gas from the knowledge that liquid having heavy specific gravity flows to the lower part. Also, when meshes belonging to gas exist in the left and right of the processing subject mesh, an attribute of the processing subject mesh is changed to gas from the knowledge that substances having different specific gravity do not stay at the same height and liquid having heavy specific gravity flows to the lower part. Therefore, in the present embodiment, when attribute of the space mesh adjacent to left, right of and below the processing subject mesh is gas, it is determined that an attribute change condition is satisfied, and the attribute of the processing subject mesh is changed from liquid to gas (steps 9 and 10).

By a change in the attribute of the mesh based on such a specific gravity relation, the presence or absence of the liquid retention can be determined according to the presence or absence of the space mesh belonging to liquid. According to such a method, the object is represented by the meshes and an analysis of the liquid retention is made from the attributes of the meshes, so that the processing can be simplified as compared with the analysis method using a free surface. Also, a determination as to whether or not the attribute of the processing subject mesh is changed can be made according to attributes of the meshes of the periphery, so that complicated analysis processing is not required and efficiency and speedup of analysis processing can be achieved.

Incidentally, according to the invention, setting of the initial condition is not limited to the embodiment described above, and the initial condition may be set by the following procedure. As a first step, attribute of the space mesh is set to liquid. As a second step, the outside boundary mesh is extracted and the attribute of the outside boundary mesh is changed from liquid to gas. In the setting method of the initial condition, the attribute change processing shown in step 8 to step 12 is performed repeatedly to some extent. Accordingly, when liquid retention occurs, a state of the liquid retention as well as the presence or absence of the liquid retention can be reproduced by a layout of the attributes of the space meshes. However, in the embodiment described above, it is not necessary to perform the attribute change processing over all the regions of the space meshes, so that it is advantageous in that efficiency of analysis is achieved.

Incidentally, in the present embodiment, the analysis model has been generated using the square meshes, but the invention is not limited to this, and meshes of a polygon such as a triangle or a pentagon may be used. However, in this case, centroid together with attribute of the space mesh exists in the left, right and below the processing subject mesh is further considered, and the attribute of the processing subject mesh is changed from liquid to gas. Specifically, in the case that the space mesh of which attribute is space and of which centroid is lower than or equal to a centroid of the processing subject mesh exists in the periphery, the attribute of the processing subject mesh is changed from liquid to gas.

Also, from the standpoint of the analysis method based on the specific gravity relation, the invention is not limited to only the analysis of the liquid retention. In addition to this, the invention can be applied to the residual fluid occurring in the object according to immersion treatment, for example, an analysis of air retention, etc. In the analysis of the air retention, it is necessary to reproduce a fluid state of air inside the electrodeposition bath. The presence or absence of the air retention can be analyzed by reversing the relation between gas and liquid in the method of the present embodiment. However, unlike the embodiment described above, it is necessary to note that the attribute of the processing subject mesh whose attribute is space is changed from gas to liquid in the case that the space mesh of which attribute is liquid and of which centroid is higher than or equal to a centroid of the processing subject mesh exists in the periphery.

Second Embodiment

Hereinafter, method of analyzing an air retention is described. The air retention retained in an object on which an immersion treatment is performed is analyzed using the analysis system 1 same as that used in analyzing the liquid retention shown in FIG. 1.

When analyzing the air retention, after setting the attributes of meshes corresponding to space to gas in the analysis model, the processing section 10a shown in FIG. 2 changes the attributes of meshes corresponding to a boundary with the outside from gas to liquid. Then, for the meshes whose attributes are set to gas, the attributes are changed from gas to liquid according to the attributes of meshes exist in the self-periphery. The determination section 10b determines the presence or absence of air retention occurring in the object according to the presence or absence of the meshes whose attributes are set to gas in the analysis model.

Based on information displayed on the display device 12, an operator operates the input device 11 and does inputs, etc. of a shape or a numeric value of the object of an analysis subject. Various databases necessary to analyze the air retention are stored in the storage device 13. In the present embodiment, the attribute database 13a is important. The attribute database 13a is a database for storing attributes set for meshes, and for every object of the analysis subject, is constructed of an attribute record group in which an individual identification number (hereinafter called "record number") is given. Basically, an attribute of a mesh and an identification number (hereinafter called "mesh number") for identifying each of the meshes are described in an individual attribute record being associated with each other.

Figure 6:
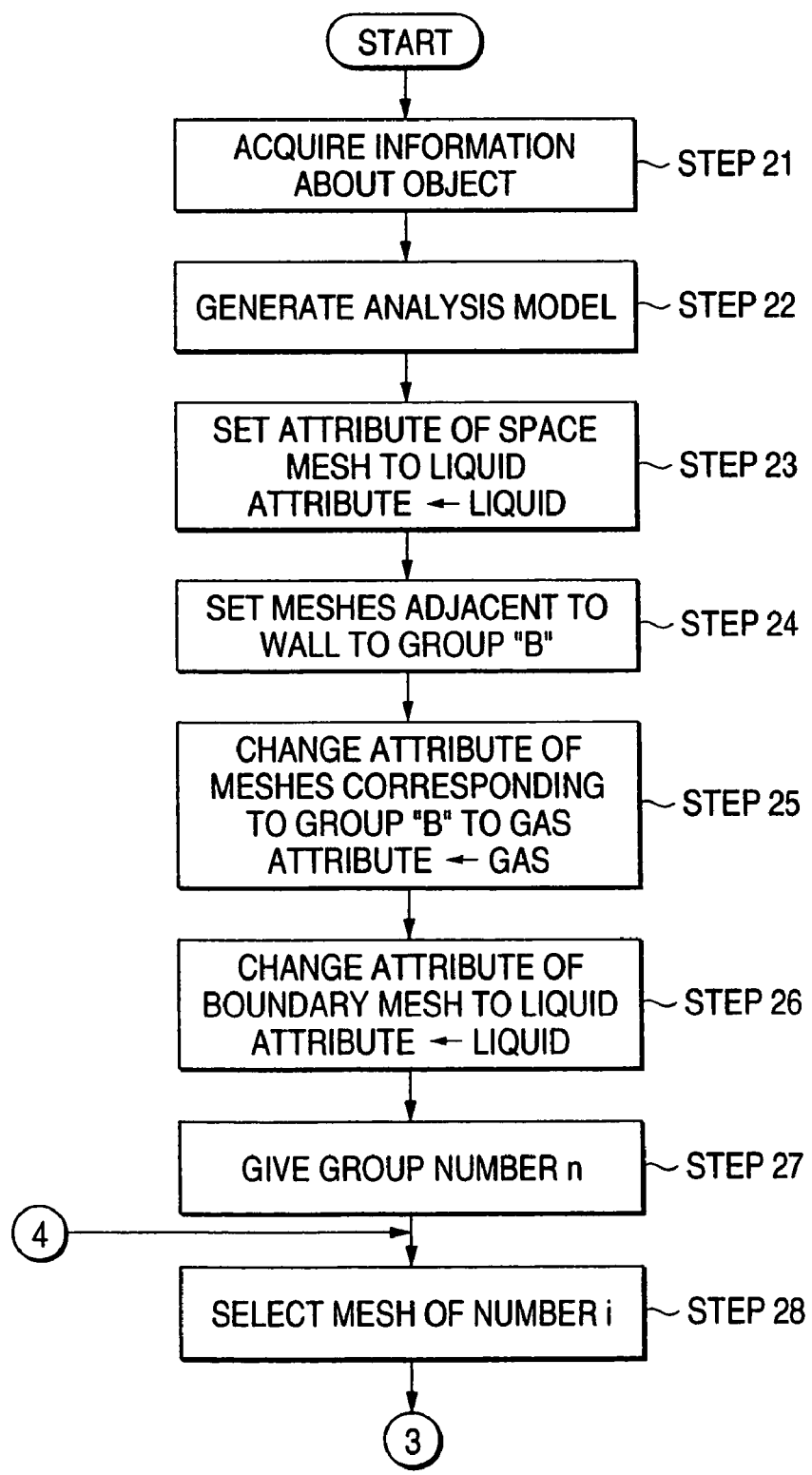
FIG. 6 is a flowchart showing an analysis procedure according to a second embodiment of the present invention.
Figure 7:
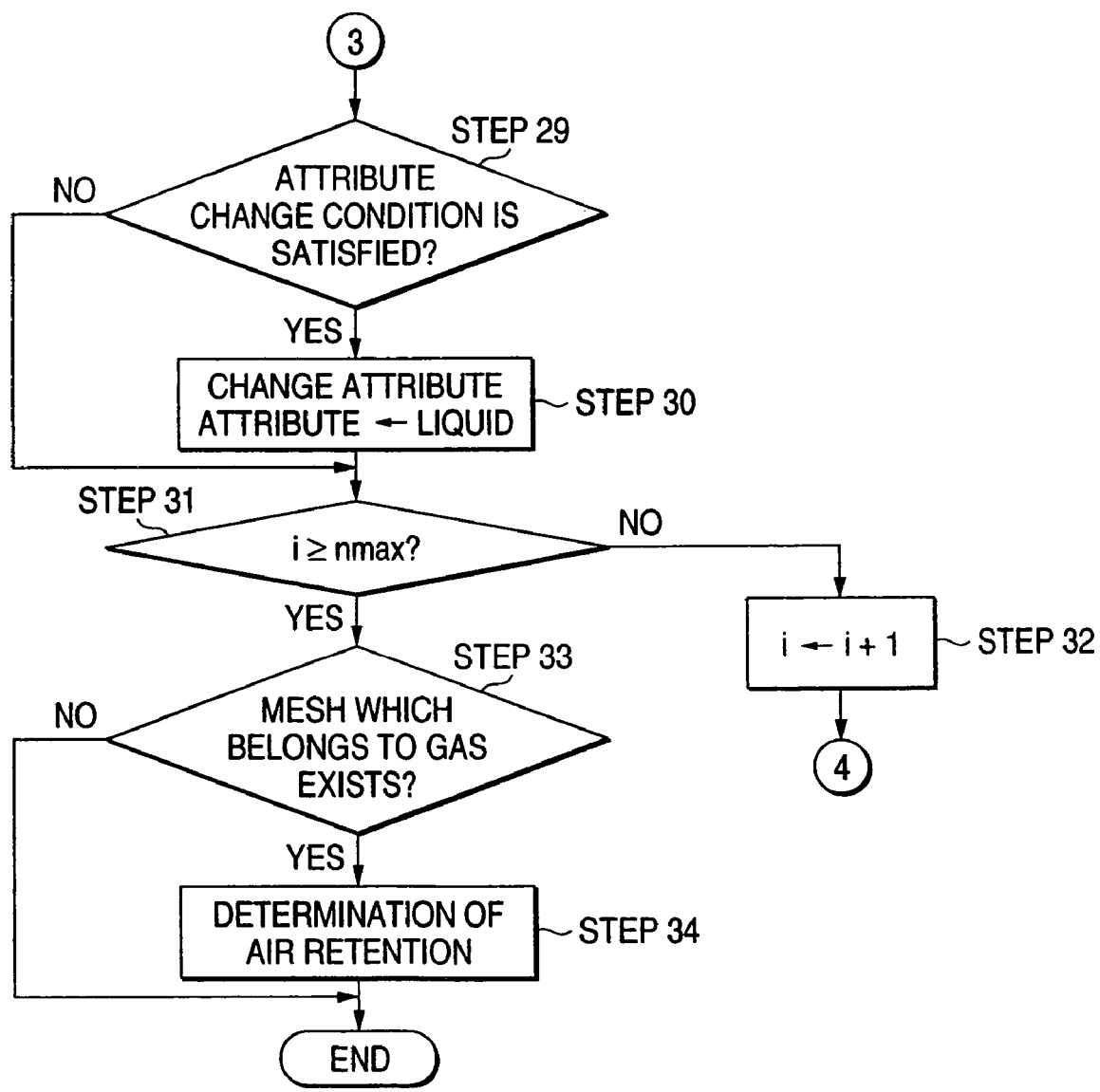
FIG. 7 is a flowchart showing the analysis procedure according to a second embodiment of the present invention.

FIG. 6 and FIG. 7 are flowcharts showing an analysis procedure according to the present embodiment. First, in step 21, information about the object is acquired according to an operation of the input device 11 by the operator. The information acquired in the step 21 includes a shape of the object or analysis precision, etc.

In step 22, an analysis model is generated. The analysis model is a model for analysis in which each of the two-dimensional cross sections of the object is represented by a plurality of minute elements (meshes) having an identical shape. In the present embodiment, the two-dimensional cross sections of the object including the vertical axis are modeled from the standpoint of reproducing a fluid state of fluid in a direction of gravity. The shape of the individual meshes in the analysis model is set in square shape for the reason that representation of the shape is easy regardless of the shape of the object, and each of the meshes is arranged in lattice shape. The number of meshes per unit area of the analysis model can be set arbitrarily according to analysis precision. For example, in the case that an internal shape of the object is complicated or that an analysis of air retention is performed with high precision, the meshes are arranged densely. On the other hand, in the case that an internal shape of the object is simple or that a determination of air retention is performed with rough precision, the meshes are arranged less densely than the former. The mesh number for identifying the self is given to each of the meshes.

The meshes constructing the analysis model include meshes corresponding to a member of the object and meshes corresponding to space. The space in the object is structural gaps or cavities, or concaves, etc. (regions caved into the inside from a contour defining an external shape of the two-dimensional cross section of the object), and possibly becomes a cause of air retention. Because of that, in the analysis model, the mesh corresponding to space (hereinafter called "space mesh") is extracted in step 23. In the extracted space meshes, an attribute of the space mesh is set to liquid. With this, after a new record number is obtained, an attribute record is newly added to the attribute database 13a. The attribute and the mesh number of the extracted space mesh are described in the attribute record being associated with each other.

In step 24, in the extracted space mesh, meshes located in the boundary with a wall surface of the object, that is, meshes adjacent to the meshes corresponding to the member of the object are extracted. The extracted space mesh is classified as a group to which an identifier "B" is given in order to distinguish the extracted space mesh from the other space mesh. The attribute of the space mesh classified as the group B is changed from liquid to gas (step 5). This change result is reflected on the attribute record added in the previous step 23 in the attribute database 13a. In this case, in the attribute record, search of the corresponding space mesh is performed using the mesh number as a search key (similarly in the following steps).

In step 26 subsequent to the step 25, outside boundary mesh is extracted in the space mesh classified as the group B. In the space mesh of the group B, the outside boundary mesh is meshes corresponding to the boundary with the outside of the object, that is, meshes corresponding to an opening portion of the space. The attribute of the extracted outside boundary mesh is changed from gas to liquid, and according to this, description of the attribute database 13a is also updated.

In step 27, an identification number (hereinafter called "group number") n (n is a natural number) for identifying the self is given to the space mesh of the group B excluding the outside boundary mesh. In processing subsequent to step 28 described below, as the space mesh of a processing subject is selected according to the group number n, the group number n is given being associated with an order of selection of the meshes. Specifically, the group number n is given so that the processing sequentially proceeds from the lower space mesh toward the upper space mesh of the analysis model. In this case, the group number n is given so that, for the space meshes having the same height, the processing proceeds from the space mesh closer to the outside boundary mesh toward the remote space mesh.

Figure 8A:
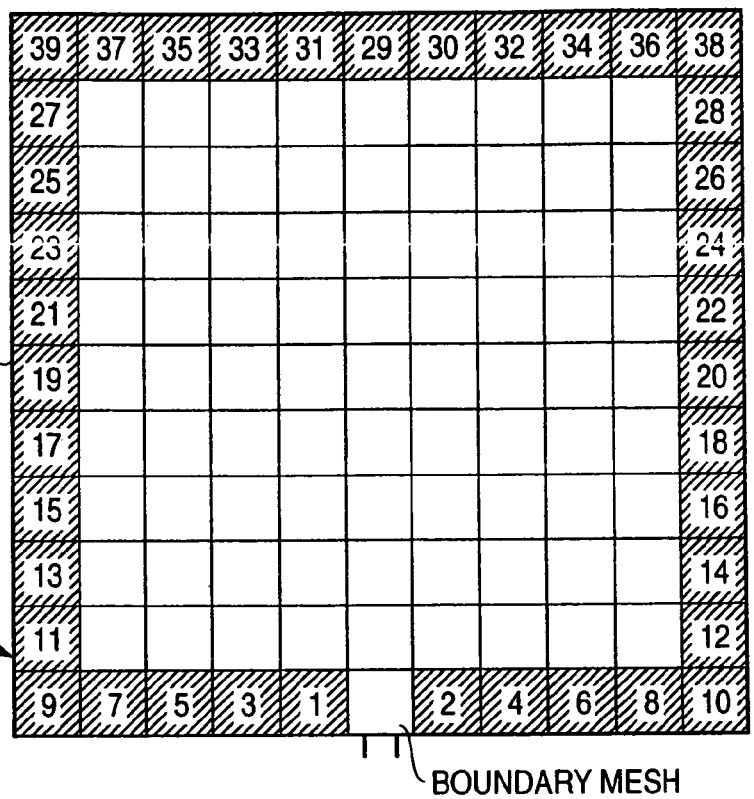
FIGS. 8A and 8B are explanatory diagrams of the group number according to a second embodiment of the present invention.
Figure 8B:
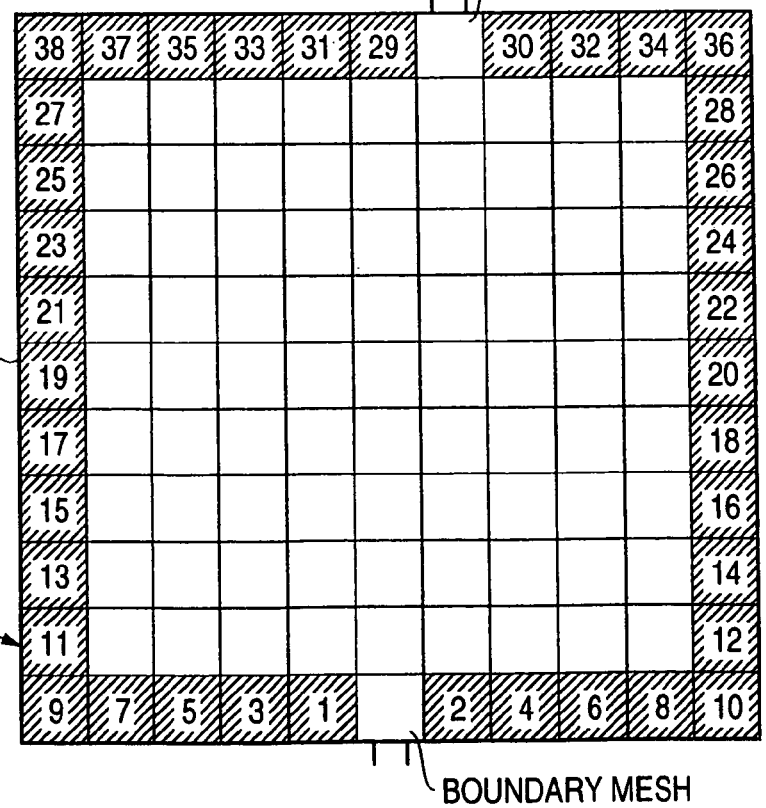

FIGS. 8A and 8B are explanatory diagrams of the group number n according to the present embodiment of the invention. FIGS. 8A and 8B show each of the analysis models related to objects of different shapes, and for convenience of description, the boundary with a member and the space mesh are shown. Hatching is done on the space mesh classified as the group B excluding the outside boundary mesh, and also group number n for identifying the self is shown. When giving the group number, the group number n is described in a manner that the corresponding attribute record of the attribute database 13a being associated with the space mesh.

In step 28, the space mesh of the group number corresponding to a number "i" according to a loop variable i is selected as a processing subject mesh on which a processing is performed. The loop variable i is initialized at an initial value ("1" in the present embodiment) in an initial routine performed before a start of the present routine. As a result of that, initially, the space mesh of the group number corresponding to the number "1" is selected as the processing subject mesh at first.

In step 29, whether or not the processing subject mesh satisfies an attribute change condition is determined based on the attribute of the space mesh exist in the periphery.

Specifically, the space mesh adjacent to the sideward portions and the upper portion of the processing subject mesh, that is, the right and left of and the above the processing subject mesh is searched using the mesh number as a search key in the attribute record. It is determined that the attribute change condition is satisfied when the attribute of any extracted space mesh is liquid. On the other hand, it is determined that the attribute change condition is not satisfied when all the attributes of each of the space mesh are gas. When a positive determination is made in this step 29, that is, when the attribute change condition is satisfied, the flowchart proceeds to step 30. On the other hand, when a negative determination is made in this step 29, that is, when the attribute change condition is not satisfied, step 30 is skipped and the flowchart proceeds to step 31.

In step 30, the attribute of the processing subject mesh (group number i) is changed from gas to liquid. According to the change, the attribute of the processing subject mesh is changed from gas to liquid in the attribute database 13a.

In step 31, it is determined whether or not the loop variable i reaches the maximum value nmax of the group number n. When a negative determination is made in this step 31, that is, the loop variable i does not reach the maximum value nmax of the group number n, the flowchart proceeds to step 32. Then, in step 32, the loop variable i is incremented by one and the flowchart returns to step 28. The processing from step 28 to step 30 is repeatedly performed while sequentially shifting the processing subject mesh until the loop variable i reaches the maximum value nmax of the group number n by the determination processing of this step 31. On the other hand, when a positive determination is made in this step 31, that is, the loop variable i reaches the maximum value nmax of the group number n, the flowchart proceeds to step 33.

In step 33, it is determined whether or not a space mesh whose attribute is gas is present in the analysis model. Specifically, the attribute record is searched based on the record number in the attribute database 13a. Then, the presence or absence of the space mesh whose attribute is gas is determined based on the attribute of each of the space meshes described in the extracted attribute record. When a positive determination is made in this step 33, that is, the space mesh which belongs to gas is present, the flowchart proceeds to step 34. Then, after air retention determination processing such as displaying a message that air retention occurs on the display device 12 is performed in step 34, the process exits from the present routine. In this case, the computer 10 may perform processing such as displaying colors according to the attribute of the space mesh in the analysis model so as to see a position of the space mesh which belongs to gas. On the other hand, when a negative determination is made in this step 33, that is, the attributes of all the space meshes are liquid, step 34 is skipped and the process exits from the present routine. Incidentally, in this case, processing such as displaying a message that air retention does not occur may be performed.

A concept of an analysis method of the present embodiment will be described below. The analysis method only has effectiveness by setting attribute with different solid state properties (specifically, specific gravity) to individual space meshes constructing an analysis model. The attribute is gas simulating the air or liquid simulating the electrodeposition liquid. The attribute set to the individual space mesh represents the presence of a substance according to the attribute in the self mesh position.

A two-dimensional cross section of the object corresponding to the analysis model includes a region corresponding to space or a member of the object. Possibly the region corresponding to the space among these regions becomes the retained space of air when soaking the object in the electrodeposition bath (occurrence of air retention). As a result of that, by extracting the space mesh and setting the attribute of the space mesh to liquid (step 23), the initial state when the object is soaked in the electrodeposition bath is reproduced.

When the air is retained in the space of the object, the air having specific gravity lighter than that of the electrodeposition liquid at least exists on a wall surface of the object. Therefore, from the standpoint of representing the air which is possibly retained in the analysis model, attribute of the space mesh belonging to a group B is changed from liquid to gas (step 25). On the other hand, when space is opened to the outside, the air is let out from that position to the outside, and the opening is filled with the electrodeposition liquid. Therefore, in the space mesh classified as the group B, an attribute of an outside boundary mesh is changed from gas to liquid (step 26).

As described above, when an initial condition relating to the attribute of each of the space mesh is set, a fluid state of the electrodeposition liquid and the air when soaked in the electrodeposition bath is reproduced by a change of the attribute of the mesh based on a specific gravity relation. That is, when a mesh belonging to liquid exists just above a processing subject mesh, an attribute of the processing subject mesh is changed from gas to liquid from the knowledge that liquid having heavy specific gravity flows to the lower part (the air flows to the upper part). Also, when meshes belonging to liquid exist in the left and right of the processing subject mesh, an attribute of the processing subject mesh is changed from gas to liquid from the knowledge that substances having different specific gravity do not stay at the same height and a gas having light specific gravity flows to the upper part. Therefore, in the present embodiment, when attribute of the space mesh adjacent to left, right of and above the processing subject mesh is liquid, it is determined that an attribute change condition is satisfied, and the attribute of the processing subject mesh is changed from gas to liquid (steps 29 and 30).

By a change in the attribute of the mesh based on such a specific gravity relation, the presence or absence of the air retention can be determined according to the presence or absence of the space mesh belonging to gas. According to such a method, the object is represented by the meshes and an analysis of the air retention is made from the attributes of the meshes, so that the processing can be simplified as compared with the analysis method using a free surface. Also, a determination as to whether or not the attribute of the processing subject mesh is changed can be made according to attributes of the meshes of the periphery, so that complicated analysis processing is not required and efficiency and speedup of analysis processing can be achieved.

Incidentally, according to the invention, setting of the initial condition is not limited to the embodiment described above, and the initial condition may be set by the following procedure. As a first step, attribute of the space mesh is set to gas. As a second step, the outside boundary mesh is extracted and the attribute of the outside boundary mesh is changed from gas to liquid. In the setting method of the initial condition, the attribute change processing shown in step 28 to step 32 is performed repeatedly to some extent. Accordingly, when air retention occurs, a state of the air retention as well as the presence or absence of the air retention can be reproduced by a layout of the attributes of the space meshes. However, in the embodiment described above, it is not necessary to perform the attribute change processing over all the regions of the space meshes, so that it is advantageous in that efficiency of analysis is achieved.

Incidentally, in the present embodiment, the analysis model has been generated using the square meshes, but the invention is not limited to this, and meshes of a polygon such as a triangle or a pentagon may be used. However, in this case, centroid together with attribute of the space mesh exists in the left, right of and above the processing subject mesh is further considered, and the attribute of the processing subject mesh is changed from gas to liquid. Specifically, in the case that the space mesh of which attribute is space and of which centroid is higher than or equal to a centroid of the processing subject mesh exists in the periphery, the attribute of the processing subject mesh is changed from gas to liquid.

Also, in the first and second embodiments, the analysis model is generated using the two-dimensional meshes, but the analysis model of the invention may be generated by three-dimensional meshes. The three-dimensional mesh is a concept including at least the two-dimensional mesh. Even when the analysis model is generated using the three-dimensional meshes, the processing can be performed in a manner similar to the case when the analysis model is generated using the meshes of the two-dimensional cross section, without being limited to shapes of the meshes.

Also, the program itself capable of being executed by a computer which executes the analysis method of the first and second embodiments described above functions as a part of the invention. Of course, a recordable medium on which this computer program is recorded may be supplied to the system having the configuration as shown in FIG. 1. In this case, the computer 10 in this system reads and executes the computer program stored in the recordable medium and thereby, an object of the invention can be achieved. Since the computer program itself implements a new function of the invention, the recordable medium on which the program is recorded also constructs the invention. The recordable medium on which the computer program is recorded includes, for example, a CD-ROM, a flexible disk, a hard disk, a memory card, an optical disk, a DVD-ROM, a DVD-RAM, etc.

According to the invention, the presence or absence of residual fluid retained in an object can be determined by a change of an attribute of a mesh based on a specific gravity relation. According to such a method, an analysis is made after the object is represented by meshes, so that its processing can be simplified. Also, a determination as to whether or not an attribute of a processing subject mesh is changed can be made uniquely according to attributes of the meshes of the periphery, so that complicated processing is not required and efficiency and speed-up of analysis processing can be achieved.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A method of analyzing for residual fluid retainment potential in an object on which an immersion treatment is to be performed, said method comprising:
generating an analysis model in which the object is represented by meshes;
setting, in the analysis model, attributes of the meshes corresponding to a space which possibly becomes a cause of the residual fluid to a first substance causing the residual fluid;
setting the attribute of the meshes corresponding to a boundary between the outside of the object and the space from the first substance to a second substance of which specific gravity differs from that of the first substance;
assuming a processing subject is each of the meshes of which attribute is set to the first substance, changing the attribute of the mesh used as the processing subject from the first substance to the second substance according to the attribute of the meshes existing in the periphery of the mesh used as the processing subject;
determining the presence or absence of possible residual fluid retainment in the object according to the presence or absence of the meshes of which attribute is set to the first substance; and
conveying the presence or absence of possible residual fluid retainment.

2. The analysis method as claimed in claim 1, wherein said residual fluid being analyzed for potential retainment in the object is a liquid, said first substance assigned as causing the liquid retention is liquid, and said second substance is gas.

3. The analysis method as claimed in claim 1, wherein said residual fluid being analyzed for potential retainment in the object is air, said first substance assigned as causing the liquid retention is gas, and said second substance is liquid.

4. The analysis method as claimed in claim 1, further comprising: storing the attributes of the respective meshes in an attribute database.

5. The analysis method as claimed in claim 1, wherein
said conveying the presence or absence of possible residual fluid retainment comprises:
displaying the presence or absence of possible residual fluid retainment on a displayed device.

6. The analysis method as claimed in claim 1, wherein said meshes are generated based on polygon shape.

7. The analysis method as claimed in claim 6, wherein said meshes are generated based on one of square shape, triangle shape and pentagon shape.

8. The analysis method as claimed in claim 1, wherein said meshes are two-dimensional meshes.

9. The analysis method as claimed in claim 1, wherein said meshes are three-dimensional meshes.

10. The analysis method as claimed in claim 1, wherein said object is a vehicle body.

11. The analysis method as claimed in claim 1, wherein said immersion treatment is an electrode position coating.

12. The analysis method of the liquid retention as claimed in claim 2, wherein after setting the attributes of the meshes corresponding to the space to gas in the analysis model, the attribute of the mesh which locates in a boundary of space and a wall surface of the object among the meshes set to gas is set from gas to liquid.

13. The analysis method of the liquid retention as claimed in claim 2, wherein when the mesh of which attribute is gas and of which centroid is lower than or equal to a centroid of the mesh used as the processing subject is adjacent to the periphery of the mesh used as the processing subject, the attribute of the mesh used as the processing subject is changed from liquid to gas.

14. The analysis method of the air retention as claimed in claim 3, wherein after setting the attributes of the meshes corresponding to space to liquid in the analysis model, the attribute of the mesh which locates in a boundary of space and a wall surface of the object among the meshes set to liquid is set from liquid to gas.

15. The analysis method of the air retention as claimed in claim 3, wherein when the mesh of which attribute is liquid and of which centroid is higher than or equal to a centroid of the mesh used as the processing subject is adjacent to the periphery of the mesh used as the processing subject, the attribute of the mesh used as the processing subject is changed from gas to liquid.

16. The analysis method as claimed in claim 5, wherein
said displaying the presence or absence of possible residual fluid retainment on the display device comprises:
displaying a position of possible residual fluid retainment on the display device.

17. The analysis method of the liquid retention as claimed in claim 12, wherein when the mesh of which attribute is gas and of which centroid is lower than or equal to a centroid of the mesh used as the processing subject is adjacent to the periphery of the mesh used as the processing subject, the attribute of the mesh used as the processing subject is changed from liquid to gas.

18. The analysis method of the liquid retention as claimed in claim 13, wherein
the meshes are arranged in lattice shape,
and when any attribute of the meshes adjacent to sideward portions and lower portion of the mesh used as the processing subject is gas, the attribute of the mesh used as the processing subject is changed from liquid to gas.

19. The analysis method of the air retention as claimed in claim 14, wherein when the mesh of which attribute is liquid and of which centroid is higher than or equal to a centroid of the mesh used as the processing subject is adjacent to the periphery of the mesh used as the processing subject, the attribute of the mesh used as the processing subject is changed from gas to liquid.

20. The analysis method of the air retention as claimed in claim 15, wherein
the meshes are arranged in lattice shape,
and when any attribute of the meshes adjacent to sideward portions and lower portion of the mesh used as the processing subject is liquid, the attribute of the mesh used as the processing subject is changed from gas to liquid.

21. The analysis method of claim 16 wherein said displaying of a position of possible residual fluid retainment on the display device includes displaying a representation showing possible residual fluid retainment relative to a model presentation of the object.

22. The analysis method of the liquid retention as claimed in claim 17, wherein
the meshes are arranged in lattice shape,
and when any attribute of the meshes adjacent to sideward portions and lower portion of the mesh used as the processing subject is gas, the attribute of the mesh used as the processing subject is changed from liquid to gas.

23. The analysis method of the air retention as claimed in claim 19, wherein
the meshes are arranged in lattice shape,
and when any attribute of the meshes adjacent to sideward portions and lower portion of the mesh used as the processing subject is liquid, the attribute of the mesh used as the processing subject is changed from gas to liquid.

24. A computer readable medium having a program including instructions for permitting a computer to perform an analysis for residual fluid retainment potential in an object on which an immersion treatment is to be performed, said instructions comprising:
generating an analysis model in which the object is represented by meshes;
setting, in the analysis model, attributes of the meshes corresponding to a space which possibly becomes a cause of the residual fluid to a first substance causing the residual fluid;
setting the attribute of the meshes corresponding to a boundary between the outside of the object and the space from the first substance to a second substance of which specific gravity differs from that of the first substance;
assuming a processing subject is each of the meshes of which attribute is set to the first substance, changing the attribute of the mesh used as the processing subject from the first substance to the second substance according to the attribute of the meshes existing in the periphery of the mesh used as the processing subject;
determining the presence or absence of possible residual fluid retainment in the object according to the presence or absence of the meshes of which attribute is set to the first substance; and
conveying the presence or absence of possible residual fluid retainment.

25. The computer readable medium as claimed in claim 24, wherein said residual fluid being analyzed for potential retainment in the object is a liquid, said first substance assigned as causing the liquid retention is liquid, and said second substance is gas.

26. The computer readable medium as claimed in claim 24, wherein said residual fluid being analyzed for potential retainment in the object is an air retention, said first substance assigned as causing the air retention is gas, and said second substance is liquid.

27. The computer readable medium as claimed in claim 24 wherein said object is a vehicle body to be immersed in a liquid.

28. The computer readable medium as claimed in claim 25, wherein after setting the attributes of the meshes corresponding to the space to gas in the analysis model, the attribute of the mesh which locates in a boundary of the space and a wall surface of the object among the meshes set to gas is set from gas to liquid.

29. The computer readable medium as claimed in claim 26, wherein after setting the attributes of the meshes corresponding to the space to liquid in the analysis model, the attribute of the mesh which locates in a boundary of the space and a wall surface of the object among the meshes set to liquid is set from liquid to gas.

30. A method of analyzing for residual fluid retainment potential in an object on which an immersion treatment is to be performed, said method comprising:
generating an analysis model in which said object is represented by meshes;
identifying those meshes that correspond to a space in said object that could retain residual fluid as space meshes;
setting the attributes of said space meshes to a value representative of a first substance causing the residual fluid;
changing the attributes of those of the space meshes that correspond to a boundary between the outside of the object and the space from said value representative of said first substance to a value representative of a second substance having a specific gravity that differs from that of the first substance;

processing those meshes whose attributes are representative of said first substance such that their attributes are changed from said value representative of said first substance to said values representative of second substance based on attributes of the meshes at the periphery of the respective mesh being processed;

determining the presence or absence of possible residual fluid retainment in the object based on the presence or absence of meshes whose attribute is set to a value representative of said first substance; and conveying the presence or absence of possible residual fluid retainment.

* * * * *